Patented Sept. 14, 1926.

1,600,045

UNITED STATES PATENT OFFICE.

WALTER HOWELL WILLIAMS IDRIS, OF LONDON, ENGLAND.

PLASTIC MATERIAL SUITABLE FOR FLOOR COVERINGS.

No Drawing. Application filed May 24, 1924, Serial No. 715,686, and in Great Britain June 23, 1923.

This invention relates to an improved plastic material which can be employed in covering floors and is especially suitable for making hard tennis courts and the like.

According to this invention I intimately mix together ground pumice or some porous mineral material of a like kind, such as ground tiles or bricks, with a drying oil, such as linseed oil or wood oil containing dryers, the amount of oil being sufficient to enable the mass to be spread with a trowel or the like over the surface to be covered.

I have found that such a material is especially suitable for use as the top surface of a hard tennis court.

I have made a successful tennis court as follows:—

I mix colouring material with drying oil and added this to ground pumice, the proportions being 5 lbs. of colouring material, 5 gallons of drying oil and 95 lbs. of ground pumice. The mixture was then spread to the depth of about half an inch upon a concrete base.

This court has been substantially unaffected by the heavy rains and snow and the frequent variations of temperature and the frosts which have been experienced since it was laid.

Moreover the material is porous and resistant and is not so tiring to the feet as surfaces usually employed in hard tennis courts.

Obviously the material may be employed for other purposes and on other bases.

Any desired colouring material can be added to give the required tint to the surface: chromium oxide, Paris green or Scheele's green, is very suitable for use in making a tennis court.

What I claim is:—

1. A floor comprising a concrete base and a covering which is resistant to large differences in temperature and moisture and is composed of porous material intimately mixed with a drying oil and spread over said base.

2. A floor covering resistant to large differences in temperature and moisture, which comprises an intimate mixture of ground pumice and drying oil in the proportions of 95 pounds of ground pumice to 5 gallons of drying oil.

3. A floor covering resistant to large differences in temperature and moisture, which comprises an intimate mixture of ground pumice, coloring matter and drying oil in the proportion of 95 pounds of ground pumice, 5 pounds of coloring material, and 5 gallons of drying oil.

In testimony that I claim the foregoing as my invention I have signed my name this 12th day of May 1924.

WALTER HOWELL WILLIAMS IDRIS.